Sept. 24, 1957     J. M. FARRELL     2,807,417
ODOMETERS
Filed Sept. 10, 1953
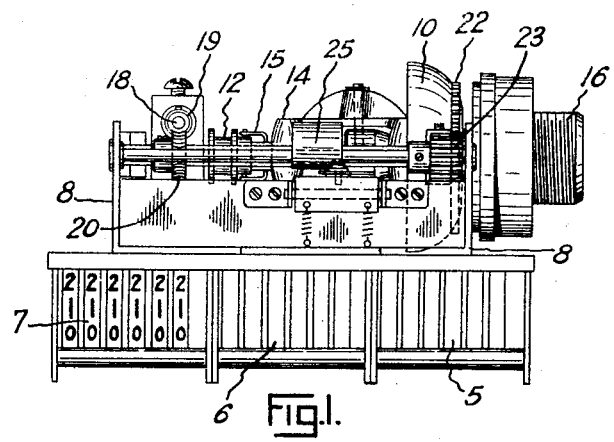
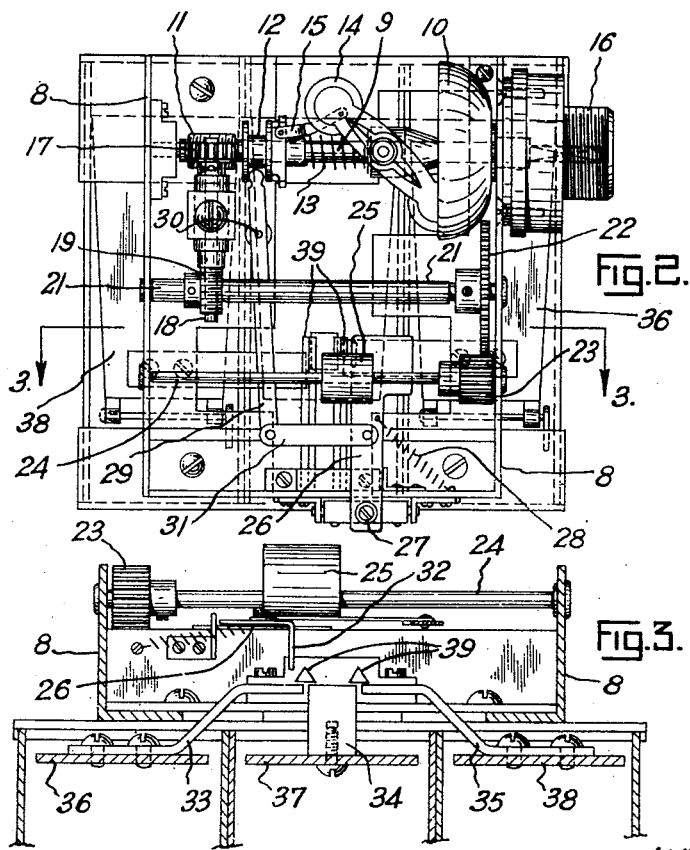
INVENTOR,
JAMES MICHAEL FARRELL
by Jewett, Mead, Browne & Schuyler,
Attorneys

United States Patent Office

2,807,417
Patented Sept. 24, 1957

2,807,417

ODOMETERS

James Michael Farrell, Walcha, near Sydney,
New South Wales, Australia

Application September 10, 1953, Serial No. 379,440

Claims priority, application Australia September 12, 1952

2 Claims. (Cl. 235—95)

This invention relates to meters for automobiles, which indicate the rate of speed and/or the mileage covered by the vehicle. Usually such meters are termed speedometers notwithstanding the fact that they incorporate an odometer for registering the mileage of each trip, and the aggregate mileage, as well as giving a visual indication of the rate of speed at any instant.

At the present time in this country it is officially recognised by traffic authorities that a large proportion of road accidents is due to excessive speed. Nevertheless those who are accustomed to driving at rates above official speed limits whenever opportunity permits pay no more by way of insurance premium than those who meticulously observe the official speeds.

The present invention is based on the premise that those who make a practice of travelling at excessive speeds should pay a greater insurance premium than those who observe speed regulations, and it provides for indicating on the vehicle the aggregate mileage covered within different ranges of speed.

Quite apart from the matter of insurance premiums however, a knowledge of the manner in which a vehicle has been driven would be of value particularly, for instance, to a prospective purchaser. Such knowledge also would be of great value to the owner of a fleet of vehicles or those responsible for maintaining them in efficient service.

The purpose of this invention is to give a clear and reliable indication at all times as to the proportion of the aggregate mileage travelled in the different ranges of speed. For instance the invention may be applied so that there may be three indicating heads, one arranged to give the total mileage travelled by the vehicle under a speed of thirty miles per hour, another arranged to give the total mileage travelled between speeds of thirty and fifty miles per hour, and the third one being arranged to give the mileage travelled over fifty miles per hour. Those three indicating heads may be incorporated in a speedometer or they may be embodied in a separate instrument located in a convenient position on the vehicle.

The invention is capable of being applied mechanically or electrically. Mechanical application is preferred because electrical apparatus for the purpose would be hard to maintain in dust-proof condition.

In order that the invention may be clearly understood and readily carried into practical effect reference is now made to the accompanying drawings, wherein:

Figure 1 shows the front elevation of an instrument constructed in accordance with one practical application of the invention, intended to be installed as a separate unit and operated through the agency of an existing speedometer shaft.

Figure 2 is a plan of the instrument illustrated by Figure 1.

Figure 3 is an enlarged vertical transverse section of the instrument taken on the plane 3—3 of Figure 2. The section is so viewed that whereas the pinion 23, for instance, appears on the right in Figure 2, it appears on the left in Figure 3.

According to the construction illustrated the instrument has three separate odometer heads 5, 6 and 7, of known construction. The head 5 is intended to indicate the total mileage travelled at speeds under thirty miles per hour, the head 6 the total travelled between thirty and fifty miles per hour, and the head 7 the total travelled over fifty miles per hour. Those three heads are arranged in the form of a gang and constitute what is virtually a bed for the instrument.

A casing or framework 8 is mounted on the gang of heads 5, 6 and 7, and in the rear portion of this casing or framework there is a short horizontal shaft 9 which carries a centrifugal governor 10 of known form, and has affixed on one of its ends a worm 11.

The shaft 9 also has mounted loosely upon it a collar 12 which is arranged so that normally a spring 13 on the shaft 9 tends to push said collar to the left, as viewed in Figure 2, whilst the weighted member 14 of governor 10 tends to pull said collar to the right, through the medium of a connecting link 15, as the speed of shaft 9 increases. The shaft 9 derives its rotation from the flexible shaft (not shown) normally provided to drive the speedometer on the vehicle. A convenient way of deriving such rotation would be to affix a bevel wheel of appropriate size to the speedometer cable and then provide a short flexible shaft in a casing which could be secured to the screw-threaded junction 16.

The worm 11 engages pinion 17 on a short axle 18. On the other end of axle 18 there is a worm 19 engaging a small worm-wheel 20. This worm-wheel 20 is fast on one end of an intermediate shaft 21. The other end has affixed to it a spur-wheel 22.

The spur-wheel 22 engages a pinion 23 on a shaft 24. This shaft carries a cam 25 and could, if desired, be arranged to actuate a speed indicating hand or the like.

Below the cam 25, and arranged to be actuated by it is an arm 26 pivoted at 27 to the casing or framework 8.

Normally the arm 26 tends to swing toward the right under influence of a spring 28, but its position at any moment is determined by a lever 29 pivoted at 30. The rear end of this lever is engaged by the collar 12, and its front end is connected by link 31 to the arm 26.

Referring now more particularly to Figure 3, it will be observed that the arm 26 has a depending finger 32. This finger is intended to engage one at a time three members 33, 34 and 35, which constitute actuating means affixed to plates 36, 37 and 38 respectively and which normally, on being depressed, actuate the odometer heads 5, 6 and 7 by reciprocal action.

Knife edges 39 are provided between the members 33 and 34 and 34 and 35 so that should the finger 32 tend to bridge and operate the two members 33 and 34 or the two members 34 and 35 it will be deflected slightly and move only one of those members.

Assuming that the meter illustrated has been installed on a vehicle and arranged to be driven by the usual speedometer cable or a branch thereof, the meter will operate as follows:

As the shaft 9 rotates, the centrifugal governor 10 will cause the collar 12 to move to and fro according to the speed of the vehicle. As the speed increases, the collar 12 will be moved towards the right (as viewed in Figure 2) and conversely, as the speed decreases, the collar will be moved towards the left. In the meantime the cam 25 is rotated continuously at a speed (determined by the speed of the vehicle) through the medium of worm 11, pinion 17, worm 19, worm-wheel 20, spur-wheel 22 and pinion 23.

In rotating, the cam 25 presses down the free end of arm 26 at recurring intervals, causing the finger 32 to engage that one of members 33, 34 and 35, above which it happens to be at the moment.

In the particular construction illustrated, at speeds below the rate of thirty miles per hour the finger 32 will push the member 33 down on each rotation of the cam 25; and as the cam is arranged to rotate once every tenth of a mile travelled by the vehicle the "tenths disc" of the "one to thirty mile" odometer 5 will be moved to display a higher digit.

As the speed of the vehicle rises above thirty miles per hour the arm 26 will be swung gradually to the left—through the medium of collar 12, lever 29, link 31 and arm 26—and the finger 32 will then be pushed down by cam 25, at recurring intervals, onto member 34. The member 34 will then actuate the odometer 6 every tenth of a mile, through the medium of plate 37.

Similarly as the speed of the vehicle rises above fifty miles per hour each tenth of a mile will be added to the odometer 7.

Thus it will be seen that the meter as a whole will at a glance show:

(1) The total mileage travelled by the vehicle at speeds below the rate of thirty miles per hour;

(2) The total travelled between thirty and fifty miles per hour; and (3) The total travelled at speeds in excess of fifty miles per hour.

To prevent any illicit adjustment of the meter the mechanism would of course be totally enclosed in a dust-proof case and sealed effectively as by a lead disc.

I claim:

1. A meter for registering the mileages traveled by a vehicle in two or more speed ranges comprising an odometer head corresponding to each speed range to be indicated, actuating means for each of said heads, a pivoted arm movable into positions wherein it is aligned with and engages separate actuating means, centrifugal means driven in proportion to the speed of the vehicle and connected to said arm to move said arm to said positions, a cam member mounted adjacent said arm and engageable therewith, said cam member being continuously rotatably driven in proportion to the speed of said vehicle and periodically operating said arm to cause said arm to engage the actuating means with which it is aligned, and means for camming said arm into alignment with one or another of two adjacent actuating means when the arm is operated while in a position where otherwise it may actuate them both.

2. The combination of claim 1 wherein the centrifugal means comprises a shaft driven in proportion to the speed of the vehicle, a centrifugal device attached to said shaft, a slidably movable collar member connected to and movable with said centrifugal device, and means interconnecting said collar and said arm.

References Cited in the file of this patent

UNITED STATES PATENTS

| 1,054,398 | Deckert | Feb. 25, 1913 |
| 1,195,280 | Shipman | Aug. 22, 1916 |
| 1,770,903 | Ach et al. | July 22, 1930 |

FOREIGN PATENTS

| 300,150 | Great Britain | Nov. 5, 1928 |